(12) United States Patent
Molz et al.

(10) Patent No.: US 8,746,164 B2
(45) Date of Patent: Jun. 10, 2014

(54) PROTECTIVE COATINGS AND METHODS OF FORMING SAME

(75) Inventors: Ronald J. Molz, Westbury, NY (US); James Frank Leach, Jr., Westbury, NY (US); Christopher Wasserman, Lausanne (CH)

(73) Assignee: Sulzer Metco (US) Inc., Westbury, NY (US)

( * ) Notice: Subject to any disclaimer, the term of this patent is extended or adjusted under 35 U.S.C. 154(b) by 433 days.

(21) Appl. No.: 12/596,197

(22) PCT Filed: Apr. 15, 2008

(86) PCT No.: PCT/US2008/060375
§ 371 (c)(1), (2), (4) Date: Jun. 8, 2010

(87) PCT Pub. No.: WO2008/130943
PCT Pub. Date: Oct. 30, 2008

(65) Prior Publication Data
US 2010/0285329 A1 Nov. 11, 2010

Related U.S. Application Data

(60) Provisional application No. 60/907,795, filed on Apr. 17, 2007.

(51) Int. Cl.
| | |
|---|---|
| *B32B 15/092* | (2006.01) |
| *B32B 15/095* | (2006.01) |
| *B63B 9/00* | (2006.01) |
| *C23C 4/06* | (2006.01) |
| *C23C 4/18* | (2006.01) |
| *C23C 4/02* | (2006.01) |
| *C23C 4/04* | (2006.01) |
| *C22C 19/00* | (2006.01) |
| *C22C 38/18* | (2006.01) |

(52) U.S. Cl.
CPC ... *C23C 4/18* (2013.01); *C23C 4/02* (2013.01); *C23C 4/04* (2013.01); *B63B 2231/02* (2013.01); *B63B 2231/04* (2013.01); *B63B 2231/06* (2013.01); *B63B 2231/40* (2013.01); *B65D 2590/023* (2013.01); *C22C 19/00* (2013.01); *C22C 38/18* (2013.01); *B32B 15/092* (2013.01); *B32B 15/095* (2013.01)
USPC ........ 114/356; 428/626; 428/624; 428/307.3; 428/418; 428/457; 427/456; 427/331; 427/405; 427/410

(58) Field of Classification Search
None
See application file for complete search history.

(56) References Cited

U.S. PATENT DOCUMENTS 2,330,365 A * 9/1943 Jackson ........................ 428/454
3,325,303 A * 6/1967 Ernest et al. .................. 428/325

(Continued)

FOREIGN PATENT DOCUMENTS

| JP | 01-142023 | 6/1989 |
| JP | 2-540780 | * 2/1990 |

(Continued)

OTHER PUBLICATIONS

Office Action dated Aug. 6, 2011 from the Patent Office of the Cooperative Council for the Arab States of the Gulf in Application No. GCC/P/2008/10612.

(Continued)

*Primary Examiner* — John J Zimmerman
(74) *Attorney, Agent, or Firm* — Greenblum & Bernstein, P.L.C.

(57) ABSTRACT

Coatings on a substrate and application methods result in coatings that can withstand different types or groups of bulk cargo and operations. This novel approach includes use of a combination of layers of coating materials at certain thicknesses and applied with certain techniques. In certain embodiments, the coating system includes coatings applied to a pretreated substrate, e.g., blasted steel cargo hold plates of an oceangoing vessel. The coatings include a bond layer and a resistance layer, e.g., an anti-corrosive layer tailored to resist at least one of corrosion, erosion, impact and wear of the substrate.

25 Claims, 4 Drawing Sheets

(56) References Cited

U.S. PATENT DOCUMENTS

| | | | | |
|---|---|---|---|---|
| 4,039,318 | A | * | 8/1977 | Patel .................................. 75/252 |
| 4,188,458 | A | * | 2/1980 | Hugosson et al. ............ 428/556 |
| 4,202,691 | A | * | 5/1980 | Yurasko, Jr. .................... 75/252 |
| 4,230,749 | A | | 10/1980 | Patel |
| 4,443,521 | A | * | 4/1984 | Kushner et al. ............... 428/679 |
| 4,753,368 | A | * | 6/1988 | Lescaut ...................... 220/62.22 |
| 4,883,703 | A | * | 11/1989 | Riccio et al. ................... 428/142 |
| 4,915,906 | A | * | 4/1990 | Champagne et al. ......... 420/441 |
| 4,983,454 | A | * | 1/1991 | Hiraki et al. ................... 428/335 |
| 5,114,797 | A | * | 5/1992 | Uihlen et al. .................. 428/553 |
| 5,169,674 | A | * | 12/1992 | Miller ........................... 427/456 |
| 5,364,543 | A | * | 11/1994 | Bosna et al. ................... 508/106 |
| 5,472,783 | A | | 12/1995 | Mosser et al. |
| 5,725,911 | A | * | 3/1998 | Tsuneta et al. ................ 427/405 |
| 5,763,070 | A | * | 6/1998 | Kerlek et al. .................. 428/329 |
| 5,921,751 | A | * | 7/1999 | Freling et al. ................. 415/200 |
| 5,981,087 | A | * | 11/1999 | Furlani et al. .................. 428/626 |
| 5,985,454 | A | | 11/1999 | McMordie et al. |
| 6,165,600 | A | | 12/2000 | Ivkovich, Jr. et al. |
| 2001/0001048 | A1 | * | 5/2001 | Yasuda et al. ................. 428/623 |

FOREIGN PATENT DOCUMENTS

| | | | |
|---|---|---|---|
| JP | 2-282460 | * | 11/1990 |
| JP | 3-75351 | * | 3/1991 |
| JP | 3-249164 | * | 11/1991 |
| JP | 05-140723 | | 6/1993 |
| JP | 08-310484 | | 11/1996 |
| JP | 11-061374 | | 3/1999 |
| JP | 2002-088462 | | 3/2002 |
| JP | 2004-137548 | | 5/2004 |
| JP | 2004-218004 | | 8/2004 |

OTHER PUBLICATIONS

Office Action from the Russian Patent Office in Russian Counterpart Application No. 2009142199/02(060035) dated Apr. 5, 2012 (with English language translation).

English language translation of Japanese Office Action conducted in counterpart Japanese Appln. No. 2010-504196 (Jul. 2, 2013).

* cited by examiner

PROTECTIVE COATINGS AND METHODS OF FORMING SAME

RELATED APPLICATION

This application claims the benefit of U.S. Provisional Patent Application No. 60/907,795, filed on Apr. 17, 2007, which is hereby incorporated by reference for all purposes as if fully set forth herein.

FIELD OF THE INVENTION

The invention relates generally to protective coatings and methods of forming the same, and more particularly to an apparatus including at least one substrate with protective coatings and methods of forming the same. The substrate may include steel cargo hold plates of an oceangoing vessel.

DISCUSSION OF THE RELATED ART

Various apparatus are used in harsh environments, e.g., corrosive environments and mechanically abusive environments, and are subjected to a number of deteriorative factors that result in the wearing away and degradation of the apparatus. These apparatus include cargo holds of oceangoing ships, cargo containers and other apparatus. For example, cargo holds of ships may be lined with various substrates, e.g., steel plates having various thicknesses. The thickness of the plates used in cargo holds typically ranges from about 13 mm to about 25 mm or greater.

The cargo holds and containers are used to carry a variety of bulk materials. The bulk materials may include high sulfur coal (lignite), grain, bauxite, coke, lime, mineral salt and other bulk materials. Many of the bulk materials subject the steel plates to a corrosive attack of the steel plates. For example, lignite coal contains sulfur and the sulfur in combination with a salt water marine environment may produce sulfuric acid, thereby producing a corrosive effect. Over time the plates corrode, requiring replacement at great expense in terms of both material and labor as well as downtime for the vessel in dry dock, i.e., non-use of the ship. This corrosion occurs especially in the lower section of the hold area. When the corrosion and erosion results in about a twenty percent (20%) loss, the plates must be replaced for structural reasons.

Additionally, loading and unloading operations of the bulk materials subject the steel plates of a cargo hold to both erosion and impact damage. The erosion is the effect of the bulk material, e.g., coal, being loaded, unloaded and shifting during transport and exposure to various environmental conditions including seawater, temperature changes, humidity and others. Heavy equipment, such as a large crane bucket—typically having an eight ton weight—and/or a front end loader, is typically used to load and unload the cargo. These loading and unloading operations damage the steel plates. For example, blades of the crane bucket and/or front end loader damage the steel plates by causing scrapes and gouges during loading and unloading operations. Deeper scrapes or gouges tend to result at high impact points, such as when the grab bucket contacts the steel plates at an angle, e.g., on the corners or tips of the scraping blades. However, in loading and unloading operations the grab bucket does not have to impact the steel plates at an angle to cause a deep impression. For example, in loading operations the grab bucket may be dropped almost parallel to the steel plate causing impact damage to the steel plate and leaving a deep impression in the steel plate.

Scraping during the loading and unloading operations creates fresh surfaces where corrosion can occur or intensifies existing corrosion. Although corrosion pitting can typically be observed even on surfaces that have not been gouged or scraped, the scraping speeds up the process by providing fresh surfaces for corrosion attack.

Related art techniques to extend the life of cargo hold steel plates include the use of asphalt coatings or other related art liners, application of a polymer based coating and even using additional steel plates. The foregoing methods add both weight and additional cost to the shipping operation. These related art techniques are also labor intensive and require regular reapplication as they do not have a long life. Moreover, these related art techniques do not minimize damage caused by the bulk cargo or loading and unloading operations of the cargo holds, thereby subjecting the steel plates in the cargo to both wear and impact damage.

Some transportation applications require that the contents of a cargo container are not affected by the shipping process. For example, transportation of bulk cargo such as coke and grain requires that the color of the coke and grain not be affected by the shipping process. For these and other cargo types, the cargo holds must be cleaned of corrosive remains such as scale and painted prior to loading the bulk cargo. These additional techniques add downtime and cost to the shipping operation.

SUMMARY OF THE INVENTION

Accordingly, the invention is directed to protective coatings and methods of forming protective coatings that substantially obviate one or more of the problems due to limitations and disadvantages of the related art.

An advantage of the invention is to provide coatings that are resistant to corrosion, erosion and wear, such as damage caused by bulk cargo or loading and unloading operations in cargo holds.

Another advantage of the invention is to provide coatings to substrates of an apparatus, e.g., a cargo hold, in-situ, thereby minimizing the downtime.

Yet another advantage of the invention is to provide protective coatings that are easily cleaned, thereby preventing damage to bulk cargo.

To achieve these and other advantages and in accordance with its purpose, the invention is directed towards a multi-layer protective coating that is resistant to impact forces and corrosion that includes a bonding layer, the bonding layer formed on a first face of a substrate and having a substrate face and a non-substrate face. The protective coating also includes a resistance layer, the resistance layer formed on the non-substrate face of the bonding layer and having a bond face and a non-bond face. A sealant layer is formed on the non-bond face of the resistance layer, and the first face of the substrate is prepared in a predetermined manner to allow the bonding layer to adhere. The resistance layer is made of predetermined material that resists the impact forces and the corrosion caused by a corrosive environment.

Another aspect of the invention is directed towards a substrate of a cargo hold including a multi-layer protective coating resistant to impact forces and corrosion. The multi-layer protective coating includes a bonding layer that bonds to the substrate. The bonding layer is formed on a first side of a substrate which preferably has been prepared by removing contamination therefrom. A resistance layer is formed directly on the bonding layer and is resistant to the impact forces and corrosion. A sealant layer is formed directly on the resistance layer and seals pores of the resistance layer.

Yet another aspect of the invention is directed towards a method of forming a multi-layer protective coating on a substrate. The method includes the steps of preparing a first substrate surface to remove corroded surface material and roughen the first substrate surface. The method also includes forming a bonding layer on the first substrate surface and forming a resistance layer on the bonding layer. The resistance layer includes at least one of an iron-based alloy and a nickel-based alloy. The method finally includes forming a sealant layer on the resistance layer; the sealant layer penetrates pores of the resistance layer.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE ILLUSTRATED EMBODIMENTS

Figure 1:
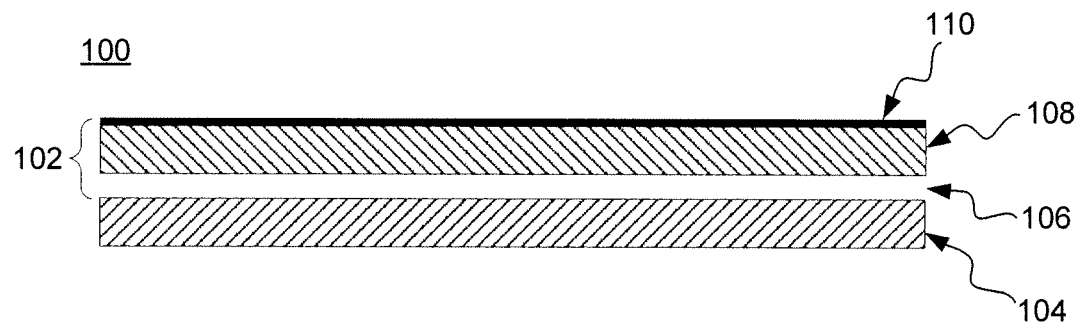
FIG. 1 shows a schematic of a cross-section of an embodiment of the invention.

The invention is directed to protective coatings and methods of forming the same. The invention is also directed towards an apparatus including substrates with protective coatings used in harsh environments, e.g., corrosive environments. Various embodiments are directed to coatings and methods of forming the coatings on a variety of different substrates. The substrates can be used in a variety of applications. In particular embodiments, the coatings are applied to the substrates, such as steel plates of cargo holds of oceangoing ships, interiors of cargo containers and substrates used in other industrial applications.

These protective coatings may include a combination of layers and materials having various thicknesses and applied with various formation techniques. Embodiments of the invention are capable of addressing environmental factors, bulk cargo factors and usage factors, e.g., loading and unloading operations, of the various substrates used in a variety of applications, thereby permitting the coatings to be tailored to specific applications experiencing harsh environments as described herein.

In one embodiment of the invention, a multi-layer protective coating resistant to impact forces and corrosion includes a bonding layer formed on a pretreated substrate, a resistance layer formed on the bonding layer and a sealant layer formed on the resistance layer. The multi-layer protective coating is also known as a damage tolerant coating. The substrate may be part of a cargo hold of a vessel and the vessel may be any transportation vessel such as a ship, an aircraft, a spacecraft, a rail-transport or a land-based vehicle. It will be understood by those of skill in the art that the cargo storage area associated with some vessels is commonly referred to as a cargo hold, and for other such vessels, the area(s) of the vessel associated with storage and transport of cargo, especially bulk materials, is commonly referred to by other terms, such as a cargo bay, hold, tank, tanker, and the like. As used herein, the term cargo hold encompasses all such variant terms.

The substrate may be configured into a plurality of different geometric configurations to form at least a portion of the apparatus as known to one of ordinary skill in the art. The substrate may also include various metal and alloy materials. For example, the substrate may include at least one of aluminum, titanium, nickel, copper, tantalum, niobium, iron, hafnium, vanadium, tungsten, zirconium and alloys thereof. In one embodiment, the substrate is an alloy including iron, but various other alloying elements may also be used, such as manganese, chromium, vanadium and tungsten. Preferably, the substrate includes a low carbon steel that is relatively inexpensive as compared to higher quality steel, e.g., 316 stainless steel. For cargo vessel holds, the substrate is preferably a low carbon steel such as A36 steel.

The substrate is subjected to pretreatment to remove contamination and/or corrosion on the surface of the substrate and/or serve to roughen the surface of substrate. While most preferably, all visible contamination and/or corrosion should be removed, pretreatment is contemplated to involve removal of all or a substantial portion of the visible contamination and/or corrosion. Such pretreatment promotes adhesion of the additional coating layers.

The bonding layer is configured to promote bonding between the substrate and the subsequent layers. Preferably, the bonding layer material is selected to provide high bond strength to the substrate and to resist oxidation of the bonding layer. The bonding layer may include metal and alloy materials. For example, the bonding layer may include at least one of iron, nickel, manganese, molybdenum and alloys thereof. Additionally, a composite may be formed with non-metals such as carbon, phosphorus, sulfur and the like. Preferably, the bonding layer includes a nickel-based alloy.

The resistance layer is a barrier layer that reduces deterioration of the substrate. The deterioration of the substrate may be caused by corrosion, erosion and wear. Corrosion may occur due to the bulk materials in contact with the substrate and native operating environments of the substrate creating a chemical action, e.g., a highly basic or acidic environment that damages the substrate. Erosion occurs due to physical action between the bulk materials and the substrate—such as movement of the materials against the substrate. By way of example, the particulate nature of the bulk materials, e.g., coal, grain, salt and the like, in contact with the substrate can cause abrasive wear to the substrate due to movement of the materials against the substrate.

Wear also can occur on the substrate due to an external operational environment that exposes the substrate to various external forces. In some instances, wear may occur during cargo loading and unloading operations thereby subjecting the substrate to both physical wear and impact damage. For example, heavy equipment, such as a large crane bucket having about an eight ton capacity and/or a front end loader used to load and unload the cargo, can cause wear and impact damage to the substrate. The eight ton bucket when dropped from about 5 ft achieves a velocity of about 0.5 m/s resulting in an impact force in excess of 60,000 lbs or approximately 200,000 psi to a surface of the substrate.

The resistance layer may include metal and alloy materials. For example, the resistance layer may include at least one of iron, nickel, manganese, molybdenum and alloys thereof. In addition, a composite may be formed with addition of nonmetals such as carbon, phosphorus, sulfur, boron and the like. The resistance layer may have an identical composition to the bonding layer. Preferably, the resistance layer includes at least one of a nickel-based alloy or an iron-based alloy.

The chemical composition of the resistance layer is generally tailored to provide improved resistance against corrosion, wear and erosion. In some embodiments where greater corrosion resistance is desired, a nickel-based alloy is used as the resistance layer. In other embodiments where greater erosion and wear resistance is desired, an iron-based alloy is used as the resistance layer. Nickel-based alloys and iron-based alloys materials are discussed in more detail below.

Optionally, the substrate also includes a sealant layer formed on the resistance layer. The sealant layer makes the substrate and the overall apparatus easier to clean. In addition, the sealant layer reduces buildup of various residues that may occur in the use of the apparatus, e.g., cargo residue. The sealant layer may include materials that are capable of penetrating pores of the coatings. The sealant layer also reduces the occurrence of galvanic reactions. After the sealant layer has dried and cured, the sealant preferably forms a protective coating resistance to gases and liquids. Various different compositions may be utilized for the sealant layer as discussed below.

Various embodiments of the invention also relate to a method of forming protective coatings on the substrates. The methods and processes according to aspects of the invention are portable, thereby allowing substrates of the apparatus to be treated at various locations including, for example, an airplane hanger, train depot, pre-launch pad, launch pad, dry-dock, wet-dock, dock, loading zone and other predetermined locations.

This portability also allows the processing to take place during transport from one location to another location or during port time. Portability is especially desirable for ocean-going vessels in order to minimize downtime and to take advantage of the fact that during some voyages not all cargo holds are utilized. Processing these holds using the methods describe herein could be done during the voyage itself thus eliminating downtime of the vessel.

In one embodiment, the method of forming a multi-layer protective coating on a substrate includes surface preparation of the substrate. A bond layer is formed on the pretreated substrate. A resistance layer is formed on the bond layer. Optionally, a sealant layer is formed on the resistance layer.

The surface preparation of the substrate includes removing existing contamination and/or corrosion on the surface of the substrate. The surface preparation also promotes adhesion of additional layers. The surface preparation may include treatment techniques to remove and/or promote adhesion including mechanical, chemical or a combination of mechanical and chemical processes.

In a preferred embodiment, the surface preparation includes treating the substrate of the apparatus with relatively coarse, sharp, clean abrasives. The resulting substrate surface profile is a function of the size of the grit chosen for the cleaning technique. A blasting technique may be utilized as known to one of ordinary skill in the art. One or more blast guns may be used with a blast unit in this treatment step. As the number of blast guns increases, the amount of treatment time is reduced. This treatment may also be conducted via a machine or manually performed by at least one person. Various application patterns, for example, blasting patterns, may be applied to the substrate. Preferably, a palletized pattern with an overlap, for example, ranging from 1 mm or greater, is applied to the substrate.

The blasting media may include particle sizes ranging from about 2 grit to about 60 grit or more. Preferably, the particle size ranges from about 14 grit to about 54 grit. More preferably, the particle size ranges from about 20 to about 40 grit. In addition, when treating steel plates of cargo holds, the composition of the blast media preferably includes an aluminum oxide composition. However, other blast media compositions, such as steel grit media and others, may also be used.

In some embodiments, the blast media may include at least one of Sulzer Metcolite® 14 having a particle size of 14 grit and an aluminum oxide blast abrasive composition, Sulzer Metcolite® C having a particle size of 20 grit and an aluminum oxide blast abrasive composition, Sulzer Metcolite® F having a particle size of 24 grit and an aluminum oxide blast abrasive composition, Sulzer Metcolite® F36 having a particle size of 36 grit and an aluminum oxide blast abrasive composition, Sulzer Metcolite® VF having a particle size of 54 grit and an aluminum oxide blast abrasive composition, Sulzer Steel Grit G-16 having a particle size of 16 grit and a steel blast abrasive composition and Sulzer Steel Grit G-25 having a particle size of 25 grit and a steel grit blast abrasive composition.

Surface preparation can also be performed in a portable structure. The portable structure may include a free-standing tent or other suitable structure to minimize cleanup. Typical tents may range in size to fit the desired application. In a preferred embodiment, the tent may be about 3 $m^2$ or larger.

The bond layer may be formed with a thermal spray process such as an atmospheric plasma spray process, a combustion wire process, a combustion powder process, an electric arc wire spray process and the like as known to one of ordinary skill in the art. Preferably, an electric arc wire spray process is used as the thermal spray process has been found to form a superior bond to a steel substrate.

Typically an electric arc wire spray uses two metallic wires, usually of the same composition, as the coating feedstock. The two wires are electrically charged with opposing polarity and are fed into the arc gun at matched, controlled speeds. When the wires are brought together at the contact point, the opposing charges on the wires create enough heat to continuously melt the tips of the wires. Propelled gas is used to atomize the now molten material and accelerate it onto the substrate surface to form the coating. The compressed gas may be one as known to those of ordinary skill in the art. For example, compressed air or nitrogen may be used as the propelling gas for the wire arc process. Nitrogen gas is the preferred propelling gas as it has been found to minimize oxide content in the formed layers.

The particular wire type used can be selected according to the substrate material and apparatus performance criteria. In a preferred embodiment, when utilizing a steel substrate and desiring a high bond strength, a nickel aluminum based alloy is applied, such as Sulzer Metco 8400 alloy wire being 1.6 mm in diameter with a chemistry of Ni 5Al in forming the bonding layer.

The bond layer can be formed to a thickness ranging from about a hundredth of a millimeter (a flash coat) to as much as about 0.2 mm or up to about 1 mm. The preferred thickness is about 0.1 mm. However, it has been found that forming a bond layer that is too thin or thick may adversely affect the performance of the bond layer. For example, if the bond layer is very thin, when the subsequent layers are severely damaged by erosion and wear forces, the bond layer can minimize the usefulness of the subsequent coatings. If the bond layer is too thick, it may weaken the subsequent coatings on the substrate, thereby making the substrate more susceptible to corrosion, erosion and wear damage.

The resistance layer may be formed with a thermal spray process such as an atmospheric plasma spray process, a combustion wire process, a combustion powder process, an electric arc wire spray process and the like as known to one of ordinary skill in the art. Preferably, an electric arc wire spray process is used as the thermal spray process to form the resistance layer.

The resistance layer is tailored to be resistant to erosion, corrosion and wear. It has been found that nickel-based alloys are, for example, more effective against corrosion. In contrast, for example, iron-based alloys are more resistant against wear and erosion.

In some embodiments, the nickel-based alloy may include nickel chromium. The nickel-based alloy may be formed with a thermal spray coating using Sulzer Electric Arc Wire Spray/Nickel Base wires, such as Sulzer Metco 8443 having a chemistry of Ni 18Cr 6Al 2Mn, Sulzer Metco 8625 having a chemistry of Ni 21Cr 9Mo 4(Ta+Nb), Sulzer Metco 8276 having a chemistry of C 276 Ni Alloy-Ni 16Cr 15.5Mo 3.8W 5.5Fe and Sulzer Metco 8718 having a chemistry of Ni 19Cr 19Fe 5(Ta+Nb) 3Mo 1Ti.

In other embodiments, an iron-based alloy may be formed with a thermal spray coating using Sulzer Electric Arc Wire Spray/Iron Base wires, such as Sprasteel® 80 having a chemistry of Fe 0.7Mn 0.80C 0.04P 0.04S, Metcoloy® 2 having a chemistry of Fe 13Cr 0.5Si 0.5Ni 0.5Mn 0.35C, Metcoloy® 5 having a chemistry of Fe 18Cr 08.5Mn 5Ni 1Si 0.15C, Metcoloy® 4 having a chemistry of Fe 17Cr 12Ni 2.5Mo 2Mn 1Si 0.08C, Sulzer Metco 8222 having a chemistry of Fe 28Cr 5C 1Mn and Sulzer Metco 8223 having a chemistry of Fe 21Mo 2C 1B.

The composition of the resistance layer may be tailored to the bulk cargo in contact with the substrate and the native environment of the substrate, e.g., an oceanic environment. In a preferred embodiment where the resistance layer is tailored to minimize corrosion, a nickel-based alloy is formed using electric arc wire spray with a corrosion resistant alloy, such as Hastelloy® Nickel Alloy C-276 having a chemistry of Ni 16Mo 15.5Cr 5Fe 3.7W.

In another preferred embodiment where the resistance layer is tailored to minimize erosion and wear resistance, an iron-based alloy is formed using electric arc wire spray with a Sulzer Metcoloy® 2 iron-based alloy wire having a chemistry of Fe 13Cr 0.5Si 0.5Ni 0.5Mn 0.35C with a 1.6 mm size.

In some embodiments, the selection of the resistive layer may be based upon knowing the specific chemical attack mechanism. The wear and erosion conditions in these embodiments are already known so these conditions may be considered a constant. For example, in high wear and erosion conditions a hard alloy, such as an iron-based alloy should be used. The iron-based alloy may include a 316 stainless steel, which also has a good resistance to corrosion caused by sulfuric attack and is resistant to lime. The 316 stainless steel may not be as corrosion resistant as compared to another alloy, but offers an excellent wear and erosion resistance and is therefore suitable to heavy wear and erosion applications.

For each specific set of conditions based on wear, erosion, corrosion and bulk cargo the composition of the resistance layer can be specifically tailored. The selection of the specific composition of the resistance layer is a process performed within the purview of one of ordinary skill in the art. For example, in a situation where a cargo ship is used to transport coal from a first city to a second city and to transport lime on the return trip, the resistance layer is chosen to be resistant to corrosion from attack from by-products of both the coal and lime and preferably includes a 316 stainless steel composition. This composition is chosen as wear and erosion are considered the primary attack agents. However, other compositions for the resistance layer may include, but are not limited to, those with higher and lower chrome, higher and lower carbon, manganese and nickel.

The resistance layer can be formed to a thickness ranging from about 0.1 mm to about 2 mm and preferably to a thickness ranging from about 0.5 mm to about 2 mm and more preferably to a thickness ranging from about 0.7 mm to about 1.1 mm.

Optionally, a sealant layer is formed on the resistance layer. The sealant layer may include various compositions having materials that are capable of penetrating pores of the coating formed therein. Preferably, the sealant layer includes a urethane-based sealant and/or epoxy based sealant. For example, the epoxy may be a two-part epoxy. Some examples of sealers include sealers from Sulzer, such as, Metcoseal® ALS, Metcoseal® AP, Metcoseal® EPS, Metcoseal® ERS, Metcoseal® SA, Metcoseal® URS and Metcoseal® 185 Sealer. Of course, other sealers as known in the art may also be used.

The sealant material may also be tailored to the specific application, for example, it can vary depending upon the bulk cargo that may be in contact in the substrates of the apparatus. It has been found that for use in a vessel transporting coal and lime, a urethane sealant layer is adequate. For other bulk cargos imparting more severe corrosion possibilities, such as alkalis, a two-part epoxy should be considered.

The sealant layer may be formed by applying the composition as a final layer, e.g., applying it onto the resistance layer. The sealant layer may be applied with methods as known in the art. For example, the sealant layer may be applied with a brush, roller, sprayer or the like. Preferably, the sealant layer is applied with a roller as it is faster than applying the sealant with a brush and cleaner than spraying inside a hold. In addition, applying the sealant with a roller forms a consistent and uniform application of the sealant. The sealant layer may be formed to a predetermined desired thickness based on the sealant used and conditions as known to one of skill in the art.

In some embodiments of the invention, in order to minimize the processing time and the amount of time an apparatus—for example, a vessel—is out of service, the method of forming coatings on the substrates may also be optimized. For example, a cargo ship typically contains four to seven holds. Each cargo hold has a considerable amount of surface area, often in excess of about 1,300 square meters. Since most of the corrosion, erosion and wear damage is on the floor and lower wall sections of the apparatus, the coatings may optionally be limited to substrates only in these areas. Even with this limiting step, there may be a very large area of about 600 $m^2$ to about 900 $m^2$ to be processed. Given the size of the area to be processed, the processing can be conducted incrementally. That is, the processing may have to be performed on a smaller area then moved to the next area to process and so forth, thereby incrementally completing the process on the entire area.

In a particular embodiment, one or more shipping containers may be used to contain and transport the necessary equipment and materials to be utilized in the processes described herein. To expedite the processing, items may be placed in the container in the order of use. For example, equipment such as generators and/or compressors required to do the work are the last items needed and are located in the back of the container or optionally installed as part of the container itself. The use of shipping containers facilitates handling onto the ship deck as well as transportation to the port or location where the coating is to be applied. Arranging the equipment and items loaded into the containers in order of need minimizes setup time. With the use of optimally loaded shipping containers for the coating application process, processing could commence within a few hours of the container arriving at the port. The comparatively compact nature of the application system also permits it to be loaded onto a cargo ship using the same equipment for moving standard shipping containers and for the method to be practiced without requiring the ship to remain docked.

Moreover, the use of mechanical aids, such as, for example, BUG-O automation tools, to manipulate the process equipment, e.g., guns, such as blast and spray guns, is preferred over hand blasting and spraying. A mechanical aid may be used for each gun that can spray or blast an area of sufficient size to minimize the repetitive moving and setup. In a preferred embodiment, the size of the area should be as large as possible to limit the number of moves of the processing equipment while ensuring that the move itself is not overly time consuming due to the size of the equipment and (in the case of blasting) cleanup requirements. More preferably, the spray area size for an application in a typical cargo space may be a rectangle having a size of about 9 m$^2$.

For optimization, the preferred overall coating system application method is to perform each layer process completely on a first cargo hold and then move onto the next hold. For example, blasting starts and finishes in the first hold and then moves to the second hold. The bonding layer is formed completely after each hold is blasted, followed by forming the resistance layer and finally the sealant layer. Doing more than one process at a time on a given hold will potentially involve more effort to arrange each process to prevent interfering with another process or introducing contamination of the layers. This is especially the case for the blasting process step.

To further limit downtime for the vessel during the application of the multi-layer protective coatings, the use of multiple complete coating system setups will significantly reduce the time of application. Working multiple shifts further limits downtime and it is feasible to spray an entire vessel (up to about 4,000 m$^2$) in about 3 to about 4 weeks. By contrast, replacing the steel decking takes considerably longer time (months) and costs considerably more as well.

Reference will now be made in detail to embodiments of the invention, examples of which are illustrated in the accompanying drawings.

FIG. 1 is a schematic of a cross-section of a coating system in accordance with an embodiment of the invention.

Referring to FIG. 1, an apparatus is generally depicted as reference number 100. The apparatus 100 includes a plurality of coatings 102 configured and even adapted to specific needs in terms of withstanding different types or groups of bulk cargo, environmental and usage factors as discussed herein. The apparatus includes a substrate 104 that has been subjected to a surface preparation to remove existing contamination and/or corrosion on the surface of the substrate 104. In addition, the surface preparation promotes adhesion of the bonding layer by providing a roughened surface.

A bond layer 106 is formed on the substrate 104. In this embodiment, the bond layer 106 includes Ni 5Al, a composition known to bond well when applied with an arc wire spray process. The bond layer 106 also may provide additional corrosion protection to the substrate 104. For example, the additional corrosion protection is provided if and when external coating layers (other layers of the coatings 102) are severely damaged from impact forces. In this embodiment, the bond layer 106 has a thickness of about 0.1 mm.

Still referring to FIG. 1, a resistance layer 108 is formed on the bond layer 106. The resistance layer 108 is tailored to provide corrosion resistance. The layer is also resistant to erosion, wear and corrosion. In this embodiment, the resistance layer 108 includes 316 stainless steel. The resistant layer has a thickness ranging from about 0.7 mm to about 1.1 mm.

A sealant layer 110 is formed on the resistance layer 108. In this embodiment, the sealant layer 110 is the final coating layer and is applied to the surface of the resistance layer 108. The sealant layer 110 consists of a urethane-based sealant or two-part epoxy composition applied to at least wet the surface and allow it to soak into pores of the resistance layer 108 thereby minimizing penetration of corrosive elements to the substrate 104. The sealant layer 110 also serves to provide a smoother finish to the coatings 102 thereby making it relatively easy to clean and/or reduce buildup of residue.

Figure 2:
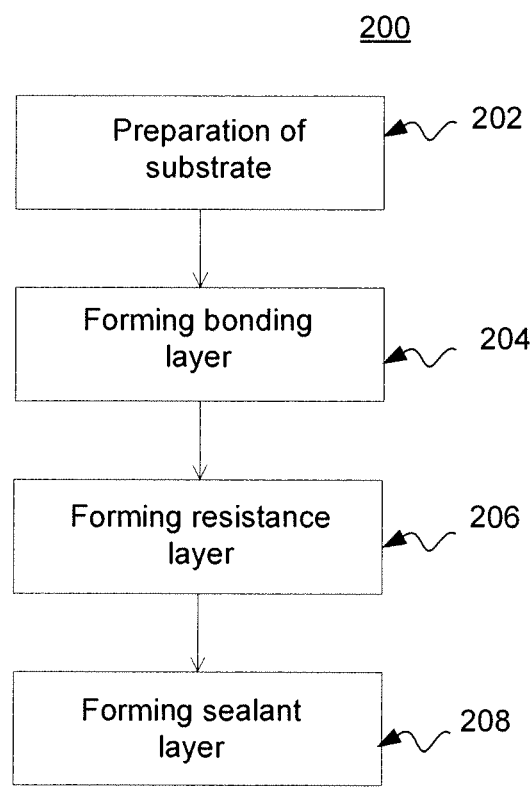
FIG. 2 shows a process flow for forming coatings in accordance with another embodiment of the invention.

FIG. 2 is a process flow for forming coatings in accordance with another embodiment of the invention.

Referring to FIG. 2, a process flow for forming coatings on an apparatus is generally depicted as reference number 200. Step 202 is directed towards surface preparation of an apparatus including at least one substrate. The substrate is a steel cargo hold plate. The surface preparation 202 of the substrate includes removing existing contamination and/or corrosion on the surface of the substrate. In addition, the surface preparation promotes adhesion of additional coating layers via roughening of the surface of the substrate.

Figure 3:
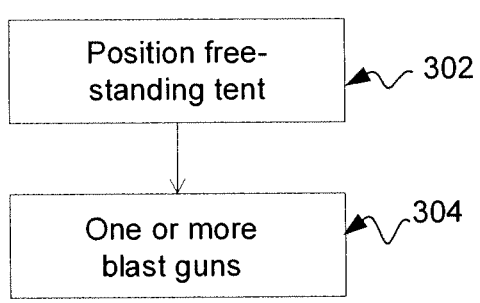
FIG. 3 shows a process flow of the pretreatment step of the embodiment illustrated in FIG. 2.

In this embodiment, the surface preparation includes a blasting process of substrates of the apparatus. FIG. 3 illustrates process flow of the surface preparation step 202. Now, referring to FIG. 3, a preferred embodiment in which a freestanding portable tent is set-up, which is readily available in an instant up configuration, is illustrated as reference number 300. Accordingly, in step 302 the tent is located over the selected work-space area, e.g., substrate, for the surface preparation process.

Also, in this embodiment, the preparation process including using a tent will minimize cleanup, and the tent can easily be moved from area to area. The tent has an area of about 3 m$^2$. After the setup of the tent, step 304 is performed. In step 304, one or more blast guns (not shown) is used with a pressure or suction blast unit (not shown) in the preparation process. One person may monitor the blasting operation while, preferably, two people move the processing equipment from treatment area to treatment area. Areas of the substrate are blasted—with a small overlap—in a palletized pattern across the entire floor and lower wall sections of the hold.

Figure 4:
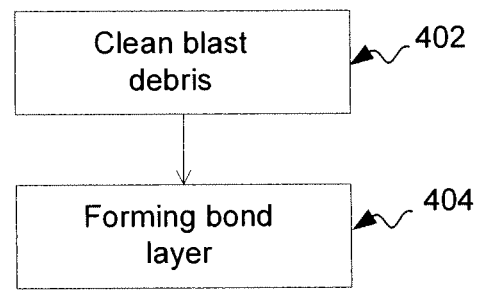
FIG. 4 shows a process flow of the bond coat application of the embodiment illustrated in FIG. 2.

Referring now again to process flow 200 of FIG. 2, step 204 is now performed. Step 204 is directed towards forming a bonding layer—in this embodiment the bonding layer has a nickel-based alloy composition. Additional details of step 204 are provided in FIG. 4 as process flow 400. A protective structure is not needed in this embodiment as a relatively thin layer and high deposition efficiency are employed. However, a protective structure may be employed in aspects of the process flow 400.

Step 402 is directed to cleaning the blasting debris of step 304. In this embodiment, forming of the bonding layer may be performed after the apparatus, e.g., a cargo hold, is blasted in step 304 and cleaned of debris in step 402. In step 404, the bond layer is formed by spraying a bond layer over the pretreated substrate, e.g., a roughened steel substrate surface. In this embodiment, the spray equipment is a high current twin wire arc spray unit with a wide spray pattern capable of deposition rates over about 50 kg/hr. A single gun is preferably used, since the use of two guns typically will not improve the process time of multiple cargo hold applications because the grit blasting limits the total pace of the coating system process. A minimum overlap of less than about 75 mm from area to area may also be used.

Figure 5:
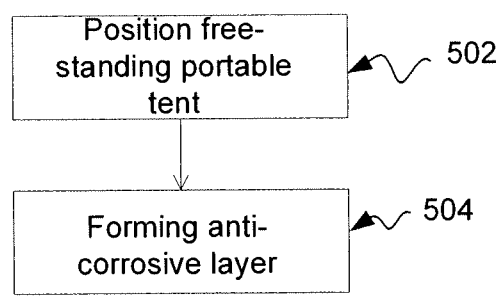
FIG. 5 shows a process flow of the resistance layer of the embodiment illustrated in FIG. 2.

Referring back to FIG. 2, step 206 of process flow 200 of FIG. 2 is directed towards forming a resistance layer. Additional details of step 206 are provided in FIG. 5 in process flow 500. The resistance layer is resistant to wear, erosion and corrosion and is formed by spraying the layer over the bonding layer. The use of a protective tent is preferred to prevent overspray from contaminating the adjacent areas and to minimize cleanup of the overspray material when spraying the resistance layer. Thus, in step 502 a free-standing portable tent is positioned over at least a portion of the substrate to be treated. Of course, the spraying may be conducted without use of the protective tent in other embodiments. In step 504, a resistance layer is formed with a high current twin wire arc unit. The arc unit equipment used for spraying the top coat may be identical to that used for spraying the bonding layer. Of course, two or more guns may be used depending upon the coating thickness required. As with the bond layer, only a minimal overlap of less than about 75 mm is required. In addition, in areas where the coating area may be terminated on a flat surface, the edge of the coating layer may be feathered to eliminate possibility of a hard edge to the entire coatings.

Now referring to step 208 of process flow 200 in FIG. 2, the application of a sealant layer is addressed. The sealant layer is applied manually with a typical paint roller setup with the roller attached to an extension rod to facilitate application to large areas of the hold at one time while minimizing the amount of relocating personnel and equipment during application. A typical extension rod would be from about 1.5 to 2 m in length, although longer or shorter rods may be used.

EXAMPLE

Step 1 (Surface preparation): In this example, an A36 steel plate was used as the substrate. This A36 steel plate is a low cost, low carbon steel available in large sheets. The steel plate was cut to a dimension of about 76.2 cm by 76.2 cm from the sheet. This type of steel was selected as it has properties similar to steel plates used in a cargo hold of oceangoing vessels. Sulzer cleaning blast media Metcolite® C was used having a particle size of 20 grit and an aluminum oxide composition. A blasting gun sprayed the blasting media on the substrate to remove contamination and promote adhesion of the subsequent layer.

Step 2 (Bonding Layer): A bonding layer was formed with a Sulzer Metco SmartArc™ advanced electric wire arc thermal spray system. The thermal spray system also included a SmartArc™ PPC Console and 350RU Power Supply also from Sulzer Metco. The gun was set up with a fine spray air cap and utilized in this process as known to one of ordinary skill in the art.

The operating parameters included using air at a primary pressure of about 35 psi and setting the power supply to about 200 Amps and about 27 Volts. Sulzer Metco 8400 electric arc wire spray with a nickel base was used. The Sulzer Metco electric arc wire/nickel base had a chemistry of Ni 5Al, a wire size of about 1.6 mm (14 gauge) and an alloy wire morphology.

The substrate was manually sprayed at a separation distance of about 12.7 cm with 3 passes. A thickness of about 0.1 mm was deposited with a deposition rate of about 38.1 microns/pass.

Step 3 (Resistance Layer): The resistance layer was formed using the same equipment described in Step 2. However, in this step an electric arc wire spray with an iron base wire was used. More specifically, Sulzer Metcoloy® 2 electric arc wire spray/iron base was used. The Sulzer Metcoloy® 2 electric arc wire spray/iron base had a chemistry of Fe 13Cr 0.5Si 0.5Ni 0.5Mn 0.35C, a wire size of about 1.6 mm (14 gauge) and an alloy wire morphology.

The substrate with the bonding layer already formed was manually sprayed at a separation distance of about 12.7 cm with 30 passes. A thickness of about 1.3 mm was deposited with a deposition rate of about 38.1 microns/pass.

Figure 6A:
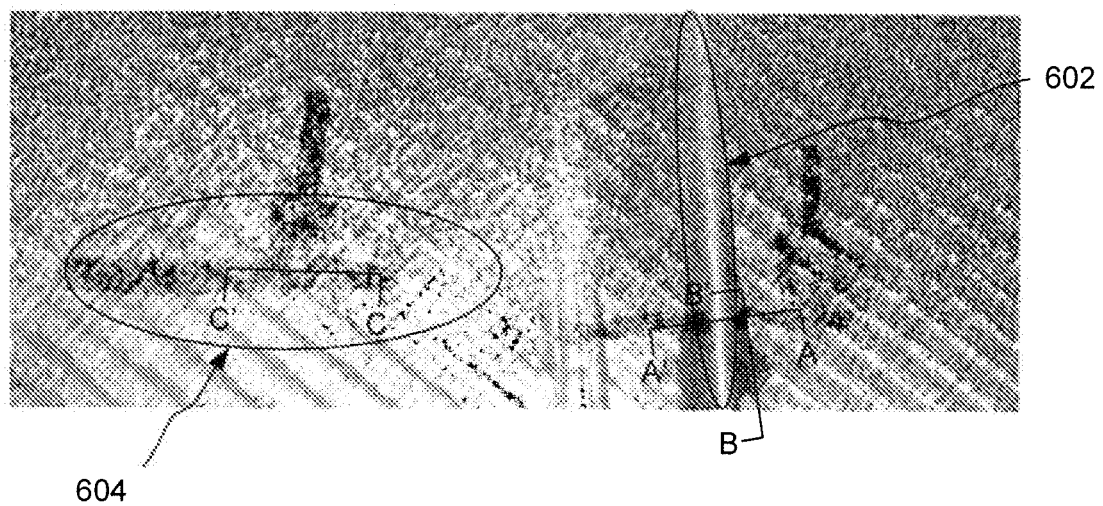
FIG. 6A shows a top down view of an apparatus as described in Example 1 further subjected to stress testing.

FIG. 6A shows a top down view of an apparatus as described in Example 1 as illustrated by reference number 600 and further stress tested as described herein. The apparatus of Example 1 having the formed protective coatings was tested. An eight ton bucket was dropped onto the substrate from a height of about 5 feet onto an impact zone 602. After dropping the eight ton bucket, subsequent scraping was performed by closing the bucket on the substrate in a scraping zone 604. These two procedures were conducted to simulate actual operation including the two types of operational forces that typically damage cargo holds during loading and unloading operations.

Figure 6B:
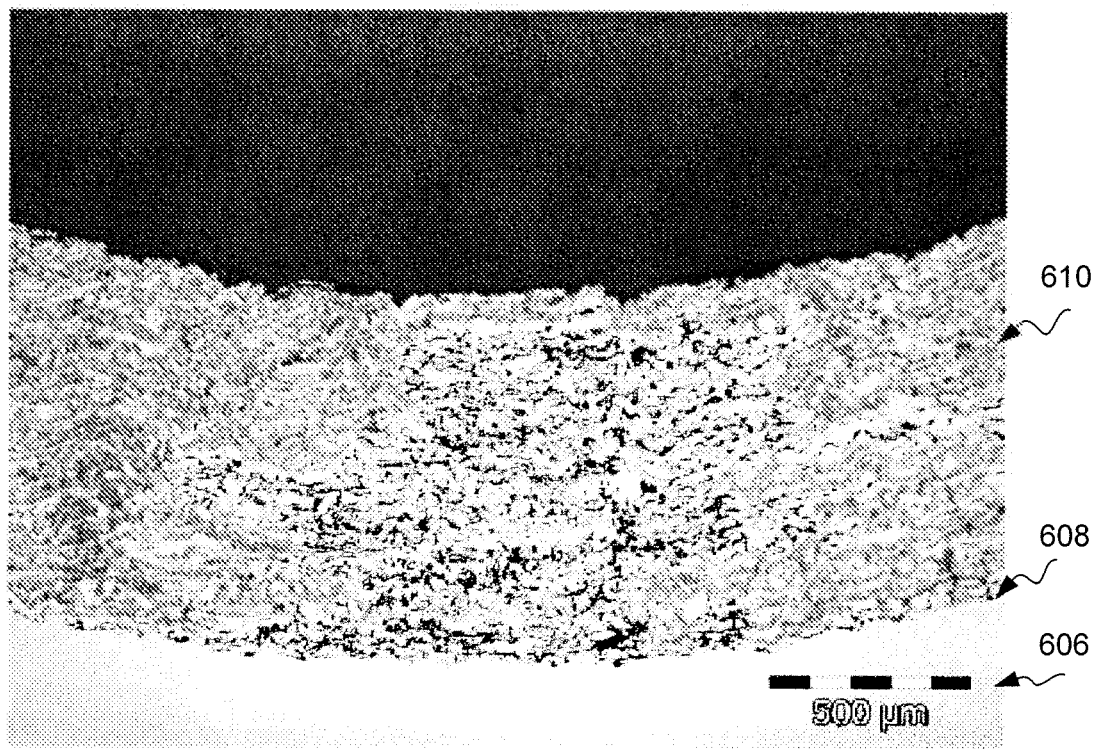
FIG. 6B shows a photomicrograph of a cross-sectional side view cut along line A to A' of the apparatus of FIG. 6A.

FIG. 6B shows a photomicrograph of a cross-sectional side view cut along line A to A' of the apparatus of FIG. 6A. Dropping the eight-ton bucket onto the impact zone 602 produced an impact force of about 200,000 psi thereby producing a deep gouge in the impact zone 602. As can be seen, despite a tremendous force being applied to the substrate 606 and the substrate having bowed, there was no detaching or delamination of the bonding layer 608 to the substrate 606 or detaching or delamination of the resistance layer 610 to the bonding layer 608. Accordingly, the coatings withstood the impact of the eight-ton bucket despite the substrate 606 yielding to the force of nearly 200,000 psi without compromising the coating system integrity.

Figure 6C:
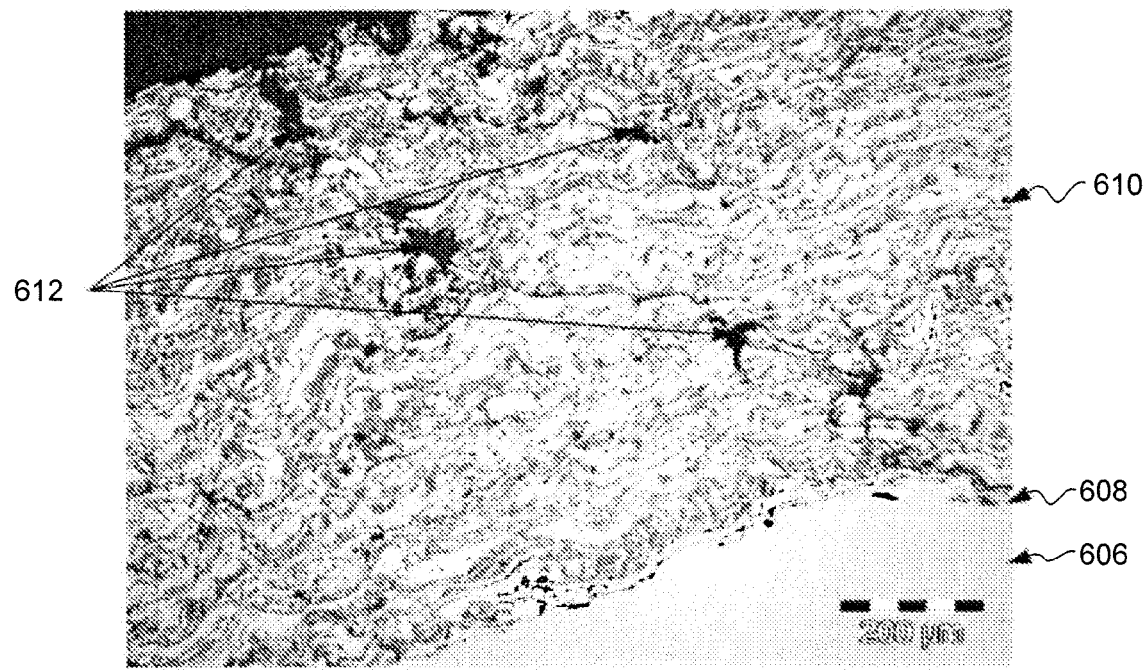
FIG. 6C shows a photomicrograph of a cross-sectional view cut along line B to B' of the apparatus of FIG. 6A.

FIG. 6C shows a photomicrograph of a cross-sectional view cut along line B to B' of the apparatus of FIG. 6A. Line B to B' is positioned at a transition zone between the region where the substrate 606 was not subjected to the impact and the impact zone 602 where the bucket was dropped on the substrate. Here the resistance layer 610 includes a few regions 612 where it sustained some minor damage, e.g., cracking and material pullout. However, there was no detaching or delamination of the bonding layer 608 to the substrate 606 or detaching or delamination of the resistance layer 610 to the bonding layer 608.

Figure 6D:
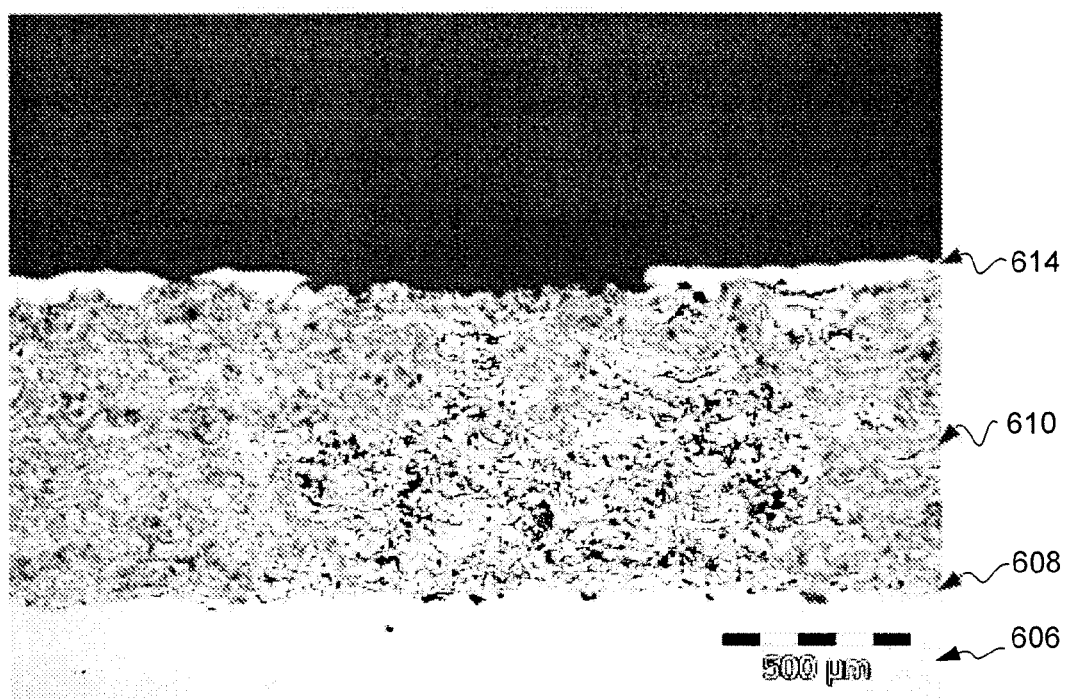
FIG. 6D shows a photomicrograph of a cross-sectional side view cut along line C to C' of the apparatus of FIG. 6A.

FIG. 6D shows a photomicrograph of a cross-sectional side view cut along line C to C' of the apparatus of FIG. 6A showing a cross section in the scraping zone 604 where the eight-ton bucket was scraped and closed on the surface of the apparatus. The bonding layer 608 and resistance layer 610 were both undamaged. There was no detaching or delamination of the bonding layer 608 to the substrate 606 or detaching or delamination of the resistance layer 610 to the bonding layer 608. The lighter areas 614 are material scraped off the eight-ton bucket blade, made of soft steel, and smeared onto the surface of the resistance layer 610. These scraped off regions are also indicated in FIG. 6A as shiny stripe patterns.

As shown in FIGS. 6A-6D and in summary, in the impact zone 602 there was no detaching or delamination of the bonding layer 608 to the substrate 606 or detaching or delamination of the resistance layer 610 to the bonding layer 608. In the impact zone 602 there was some removal of the resistance layer 610. In the scraping zone 604 there was no detaching or delamination of the bonding layer 608 to the substrate 606 or detaching or delamination of the resistance layer 610 to the bonding layer 608.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A multi-layer transportation vessel hold surface protective coating arranged in or on a transportation vessel, comprising:
    a thermal sprayed bonding layer formed on and in contact with a first face of the transportation vessel hold surface prepared in a manner to allow the bonding layer to adhere, the bonding layer having a hold surface face and a non-hold surface face;
    a resistance layer made of a material resistant to impact forces and corrosion caused by a corrosive environment in a vicinity of the transportation vessel hold surface arranged in or on the transportation vessel, the resistance layer formed on and in contact with the non-substrate face of the bonding layer, the resistance layer having a bond face and a non-bond face; and
    a sealant layer formed on and in contact with the non-bond face of the resistance layer.

2. The coating of claim 1, wherein the transportation vessel is at least one of a ship, an aircraft, a spacecraft, a rail-transport vehicle, and a land-based vehicle.

3. The coating of claim 1, wherein the bonding layer comprises at least one of a metal and metal alloy, the resistance layer comprises at least one of a metal and metal alloy, and the sealant layer comprises at least one of a urethane-based sealant and an epoxy.

4. The coating of claim 1, wherein the sealant layer comprises at least one of a urethane-based sealant and an epoxy.

5. The coating of claim 1, wherein the sealant layer seals pores of the resistance layer.

6. The coating of claim 1, wherein the resistance layer comprises at least one of a nickel-based alloy and an iron-based alloy.

7. The coating of claim 6, wherein the iron-based alloy comprises a Fe 13Cr 0.5Si 0.5Ni 0.5Mn 0.35C composition.

8. The coating of claim 1, wherein the resistance layer has a thickness range of about 0.1 mm to about 2 mm.

9. The coating of claim 1, wherein the bonding layer comprises a nickel-based alloy.

10. The coating of claim 9, wherein the nickel-based alloy has a composition selected from the group consisting of Ni 5Al composition, a Ni 20Al composition, a Ni 20Al20Fe 4Cr composition, and combinations thereof.

11. The coating of claim 1, wherein the bonding layer has a thickness ranging from about 0.02 mm to about 0.3 mm.

12. The coating of claim 1, wherein the transportation vessel hold surface is a cargo hold plate of an oceangoing vessel.

13. The coating of claim 1, wherein the resistance layer comprises a Ni 16Mo 15.5Cr 5Fe 3.7W composition.

14. A transportation vessel hold surface substrate arranged in or on a transportation vessel having a multi-layer protective coating resistant to impact forces and corrosion, comprising:
    a thermal sprayed bonding layer that bonds to the transportation vessel hold surface substrate, wherein the bonding layer is formed on and in contact with a first side of the transportation vessel hold surface substrate from which contamination has been removed;
    a resistance layer formed directly on and in contact with the bonding layer, wherein the resistance layer is structured to be resistant to the impact forces and corrosion caused by a corrosive environment in a vicinity of the transportation vessel hold surface substrate arranged in or on the transportation vessel; and
    a sealant layer formed directly on and in contact with the resistance layer for sealing pores of the resistance layer.

15. The substrate of claim 14, wherein the resistance layer comprises at least one of a nickel-based alloy and an iron-based alloy.

16. The substrate of claim 14, wherein the resistance layer comprises a Ni 16Mo 15.5Cr 5Fe 3.7W composition.

17. A method of forming a multi-layer transportation vessel hold surface protective coating in or on a transportation vessel, comprising the steps of:
    preparing a first substrate surface of the transportation vessel hold surface by removing corroded surface material from the first substrate surface and roughening the first substrate surface;
    thermal spraying a bonding layer on and in contact with the first substrate surface;
    forming a resistance layer on and in contact with the bonding layer, the resistance layer being resistant to impact forces and corrosion caused by a corrosive environment in a vicinity of the transportation vessel hold surface arranged in or one the transportation vessel and comprising at least one of an iron-based alloy and a nickel-based alloy; and
    forming a sealant layer on and in contact with the resistance layer, wherein the sealant layer penetrates pores of the resistance layer.

18. The method of claim 17, wherein the transportation vessel hold surface is a steel plate of a cargo hold of the transportation vessel.

19. The method of claim 18, wherein the transportation vessel is at least one of a ship, an aircraft, a spacecraft, a rail-transport vehicle, and a land-based vehicle.

20. The method of claim 17, wherein the forming of the resistance layer comprises forming the resistance layer with a thermal spray coating.

21. The method of claim 20, wherein the thermal spray coating is formed with an electric wire arc spray system and the resistance layer comprises at least one of a nickel-based alloy and an iron-based alloy.

22. The substrate of claim 14, wherein the transportation vessel hold surface substrate is a steel plate arranged in a cargo hold of the transportation vessel.

23. The substrate of claim 14, wherein the transportation vessel hold surface substrate is arranged in or on a transportation vessel comprising least one of a ship, an aircraft, a spacecraft, a rail-transport vehicle, and a land-based vehicle.

24. The coating of claim 1, wherein the resistance layer has a thickness range of about 0.5 mm to about 2 mm.

25. The coating of claim 1, wherein the resistance layer has a thickness range of about 0.7 mm to about 1.1 mm.

* * * * *